US010757794B1

(12) United States Patent
Worsham

(10) Patent No.: US 10,757,794 B1
(45) Date of Patent: Aug. 25, 2020

(54) USER PROGRAMMABLE WIRELESS PUSHBUTTON SWITCH SYSTEM

(71) Applicant: David Worsham, Santa Rosa Beach, FL (US)

(72) Inventor: David Worsham, Santa Rosa Beach, FL (US)

(*) Notice: Subject to any disclaimer, the term of this patent is extended or adjusted under 35 U.S.C. 154(b) by 0 days.

(21) Appl. No.: 16/587,971

(22) Filed: Sep. 30, 2019

Related U.S. Application Data

(60) Provisional application No. 62/739,486, filed on Oct. 1, 2018.

(51) Int. Cl.
| | |
|---|---|
| *H05B 47/19* | (2020.01) |
| *H01H 13/14* | (2006.01) |
| *H01H 23/28* | (2006.01) |
| *G08C 17/02* | (2006.01) |
| *H05B 45/10* | (2020.01) |
| *H05B 45/37* | (2020.01) |
| *H05B 47/16* | (2020.01) |

(52) U.S. Cl.
CPC ............ *H05B 47/19* (2020.01); *G08C 17/02* (2013.01); *H01H 13/14* (2013.01); *H01H 23/28* (2013.01); *H05B 45/10* (2020.01); *H05B 45/37* (2020.01); *H05B 47/16* (2020.01); *G08C 2201/21* (2013.01); *G08C 2201/33* (2013.01)

(58) Field of Classification Search
None
See application file for complete search history.

(56) References Cited

U.S. PATENT DOCUMENTS

| 5,661,517 | A | * | 8/1997 | Budow | G06Q 20/123 348/E7.074 |
|---|---|---|---|---|---|
| 6,750,803 | B2 | * | 6/2004 | Yates | G06F 3/03547 341/176 |
| 7,170,422 | B2 | * | 1/2007 | Nelson | G08C 19/28 340/10.32 |
| 7,268,694 | B2 | * | 9/2007 | Hayes | G08C 19/28 340/12.23 |
| 7,398,541 | B2 | * | 7/2008 | Bennington | A63F 13/338 348/564 |
| 7,429,979 | B2 | * | 9/2008 | Mears | G08C 23/04 341/23 |

(Continued)

*Primary Examiner* — Amy Cohen Johnson
*Assistant Examiner* — Jianzi Chen
(74) *Attorney, Agent, or Firm* — Lanier Ford Shaver & Payne, PC; Gerald M. Walsh, Esq.

(57) ABSTRACT

A user programmable pushbutton switch system having a central processing unit (CPU), an IR transceiver, lights, and a current sensor. The switch is programmed with a remote controller having a CPU, an IR transceiver, programming buttons, a sending button, and a display. The programming buttons provide signals to the CPU in the remote controller for selection of specific program options which are sent to the CPU in the pushbutton switch when the ENTER button is pressed. The specific program options are then executed in the pushbutton switch. The program options include Function, Current, Dimmer, Turn timer off, and Turn timer on options. The Function options include ON/OFF through one electrical output channel, a momentary ON function through one channel, Nav/Anc through two channels, OFF-ON-ON with two channels, and a dimmer function with two channels.

19 Claims, 7 Drawing Sheets

(56) References Cited

U.S. PATENT DOCUMENTS

| | | | | |
|---|---|---|---|---|
| 2006/0250745 A1* | 11/2006 | Butler | ............... | H05B 47/16 |
| | | | | 361/160 |
| 2009/0066557 A1* | 3/2009 | Higginson | ............ | G06F 3/0238 |
| | | | | 341/176 |
| 2012/0050310 A1* | 3/2012 | Patel | ............... | G08C 17/00 |
| | | | | 345/593 |

* cited by examiner

Select Options on the Remote
Controller

Functions
Current
Dimmer
Turn timer off
Turn timer on

Fig. 7

Select Options for Functions on
the Remote Controller

F1: on/off      1 channel
F2: Momentary      1 channel
F3: Nav/Anc      2 channels
F4: Off-ON-ON      2 channels
F5: Dimmer      2 channels

Fig. 8

Programing Mode on the Pushbutton Switch and Remote Controller

Push and hold pushbutton 24 on switch 21 for 4 seconds.
Release pushbutton 24 on switch 21 - color 1 flashes on switch 21.
Press the Select button 31 on the remote 30.
Scroll with up 32 and down 33 buttons to select FUNCTION.
Press and hold the Select button 31 – color 2 flashes fast on switch 21.
Push and hold pushbutton 24 on switch 21 to exit programming.

Fig. 9

Program a Function on the Remote Controller

Press Select repeatedly on the remote 30 to select FUNCTION mode.

Scroll with UP 32 and DOWN 33 buttons on the remote 30 to select a desired function.

Press and hold the ENTER button 34 on the remote 30 to enter the selected function – color 2 flashes fast on the switch 21.

Fig. 10

Program an Electrical Current on the Remote Controller

Press SELECT 31 repeatedly on the remote 30 to select CURRENT mode.

Scroll with UP 32 and DOWN 33 buttons on the remote 30 to adjust the current setting.

Press and hold the ENTER button 34 on the remote 30 to enter the selected current setting – switch 21 flashes color 2 fast.

Fig. 11

Read Selected Current on the Remote Controller

Press SELECT 31 repeatedly on the remote 30 to select CURRENT mode.

Press and hold the SELECT 31.

The value of the current that was selected is shown on the remote display 35.

Fig. 12

Program the Dimmer on the Remote Controller

Press SELECT 31 repeatedly on the remote 30 to select FUNCTION mode.

Scroll with UP 32 and DOWN 33 buttons on the remote 30 to select DIMMER.

Press and hold the ENTER 34 button on the remote to enter DIMMER.

Press the SELECT button 31 on the remote 30 to select DIMMER.

Scroll with UP 32 and DOWN 33 buttons on the remote 30 to adjust the dimmer percentage.

Press the ENTER 34 button on the remote 30 to enter the selected dimmer percentage – color 2 flashes fast on the switch.

Fig. 13

Program the TIMER ON or TIMER Off on the Remote Controller

Press SELECT 31 repeatedly on the remote 30 to select TIMER ON or TIMER OFF mode.

Scroll with UP 32 and DOWN 33 buttons on the remote 30 to select TIMER ON or TIMER OFF value.

Press and hold the ENTER 34 button on the remote 30 to enter TIMER ON or TIMER OFF value – color 2 flashes fast on the switch 21.

Fig. 14

Operate Turn on the Timer on the Pushbutton Switch

Push and hold the pushbutton 24 on the switch 21 for 8 seconds until light 1 flashes twice.

Release the pushbutton 24.

Light 1 flashes with light 3 to indicate TIMER ON is being entered.

Light 2 flashes with yellow light indicating the timer is on and the switch 21 will turn on after the programmed time has elapsed.

Push the pushbutton 24 to terminate the TIMER ON mode and to turn off the flashing light.

Fig. 15

Operate the Dimmer on the Pushbutton Switch

Push the pushbutton 24 in the pushbutton switch 21 to turn on a light.

Push and hold the pushbutton 24 to make the dimmer cycle from zero light intensity to 100% light intensity.

Release the pushbutton 24 at the desired intensity.

Fig. 16

//USER PROGRAMMABLE WIRELESS
PUSHBUTTON SWITCH SYSTEM

CROSS-REFERENCE TO RELATED APPLICATIONS

This patent application claims the benefit of U.S. Provisional Patent Application No. 62/739,486 filed on Oct. 1, 2018, the contents of which are incorporated herein by reference.

FIELD OF THE INVENTION

This invention relates to pushbutton switches and, more particularly, to a wireless programmable pushbutton switch that is user programmable electronically and remotely.

BACKGROUND OF THE INVENTION

Programmable pushbutton switches are known. FIG. 1 shows an example of this type of switch. The pushbutton switch 10 has a front end 11 and a back end 12. Several wires exit the back end 12 of the switch 10 to provide power to the switch 10 and output to various lights and appliances. These wires include positive 13 and negative 14 wires from a power supply 15; positive output amperage regulating wires 16, 17, and 18; and positive output wires to channel 1 19 and channel 2 20. Various amperages can be programmed manually into the switch by connecting one or more output wires 16, 17, and 18 together. In the illustration of FIG. 1 connecting wires 17 and 18 together will provide 15 amps to the system. Connecting wires 16 and 18 together will provide 10 amps to the system. Connecting wires 16, 17, and 18 together will provide 5 amps to the system. If the switch 10 is configured to put out 5 amps to channels 19 and 20 then it will be necessary to rearrange the connections of the wires 16, 17, and 18 to change the amperage to supply 15 amps. The wires 16, 17, and 18 will have to be accessed, exposed, wire 16 will have to be disconnected from 17 and 18, and the wires restored. If a different range of amperages is needed, for example 2.5 to 10 amps, a different switch with that configuration will have to be used. This method of manual programming the switch 10 is time consuming and relatively inefficient. What is needed is a method of programming the switch electronically and wirelessly.

SUMMARY OF THE INVENTION

This invention provides a user programmable pushbutton switch system wherein a pushbutton switch can be programmed remotely with a remote controller. The pushbutton switch has a housing containing a central processing unit (CPU) with memory, an IR transceiver, lights, and a current sensor with a driver having one or more electrical output channels. The remote controller has a CPU with memory, an IR transceiver, programming buttons UP, DOWN, and SELECT, a sending button ENTER, and a display. When the UP, DOWN, and SELECT buttons are pressed they provide signals to the CPU in the remote controller for selection of specific program options which are sent to the CPU in the pushbutton switch when the ENTER button is pressed. The specific program options and are then executed in the pushbutton switch.

The pushbutton switch is configured for programming mode by pushing and holding the push button of the pushbutton switch, selecting FUNCTION on the remote controller, and pushing and holding the pushbutton. The program options include Function, Current, Dimmer, Turn timer off, and Turn timer on options. The Function option includes ON/OFF through one electrical output channel, a momentary ON function through one channel, Nav/Anc through two channels, OFF-ON-ON with two channels, and a Dimmer function with two channels.

The pushbutton switch is programmed for a particular function or for a particular electrical current by selecting FUNCTION or CURRENT, respectively, on the remote controller using the SELECT button, using the UP or DOWN buttons to select a function or adjust the current, and pressing an ENTER button on the remote controller. The Dimmer option is programmed by selecting DIMMER on the remote controller using the SELECT button, adjusting the percentage of dimming using the Up and DOWN buttons on the remote controller, and pressing and holding the ENTER button on the remote controller. The Turn timer on or Turn timer off option is programmed by selecting TIMER ON or TIMER OFF on the remote controller using the SELECT button, selecting the timer on or off value using the UP and DOWN buttons on the remote controller, and pressing and holding the ENTER button on the remote controller.

The timer is turned on in the push button switch by pushing and holding the pushbutton on the pushbutton switch for a specific number of seconds and then releasing the pushbutton. The Dimmer is set by pushing the pushbutton on the pushbutton switch until a light in the pushbutton switch turns on and then releasing the pushbutton when the light reaches a desired intensity. The display on the remote controller displays a selected current by selecting CURRENT on the remote controller using the SELECT button and the SELECT button is pressed and held.

An advantage of the present invention is a programmable pushbutton switch that can be programmed remotely by a user.

Another advantage is that the electrical current (amperage) provided by the pushbutton switch can be adjusted remotely, eliminating the need to expose, disconnect, and reconnect wires in the pushbutton switch or to replace the switch.

Another advantage is a pushbutton switch that will turn lights and other devices on and off automatically at desired times.

Another advantage is a pushbutton switch that can be made dimmable remotely.

BRIEF DESCRIPTION OF THE FIGURES

FIG. 7 is a table showing select options on the remote controller.

FIG. 8 is a table showing select options for the functions option.

FIG. 9 is a flow chart of a method of placing the pushbutton switch in a programming mode with the remote controller.

FIG. 10 is a flow chart of the method of programming a function option in the pushbutton switch with the remote controller.

FIG. 11 is a flow chart of a method of programming an electrical current option in the pushbutton switch with the remote controller.

FIG. 12 is a flow chart of a method of reading a value of an entered electrical current for the pushbutton switch on a display screen of the remote controller.

FIG. 13 is a flow chart of a method of programming the Dimmer option in the pushbutton switch with the remote controller.

FIG. 14 is a flow chart of a method of programming a timer option in the pushbutton switch with the remote controller.

FIG. 15 is a flow chart of the method of operating the pushbutton switch for a timer on or off option.

FIG. 16 is a flow chart of a method of operating the pushbutton switch to set a dimmer value.

DETAILED DESCRIPTION OF THE INVENTION

While the following description details the preferred embodiments of the present invention, it is to be understood that the invention is not limited in its application to the details of arrangement of the parts or steps of the methods illustrated in the accompanying figures, since the invention is capable of other embodiments and of being practiced in various ways.

Figure 1:
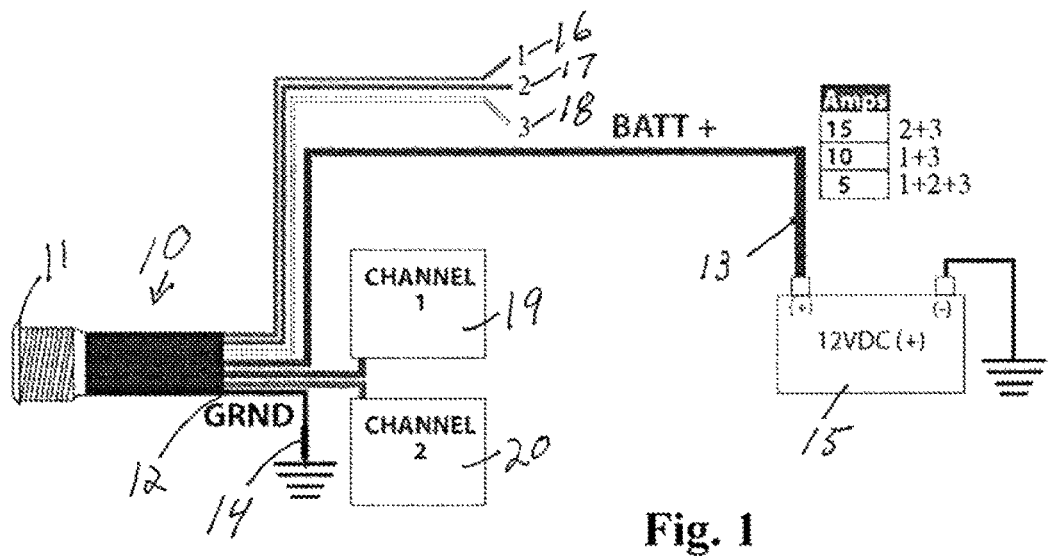
FIG. 1 shows a diagram of a pushbutton programmable switch of the prior art.
Figure 2A:
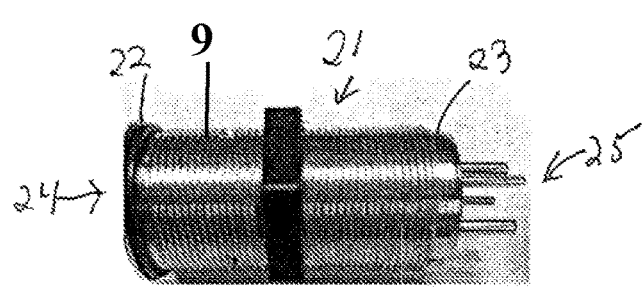
FIG. 2A is a side perspective view of a pushbutton switch of the present invention.
Figure 2B:
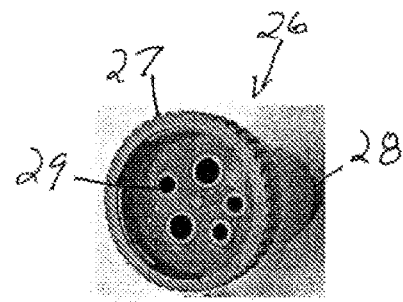
FIG. 2B is a front perspective view of a plug for the pushbutton switch.
Figure 2C:
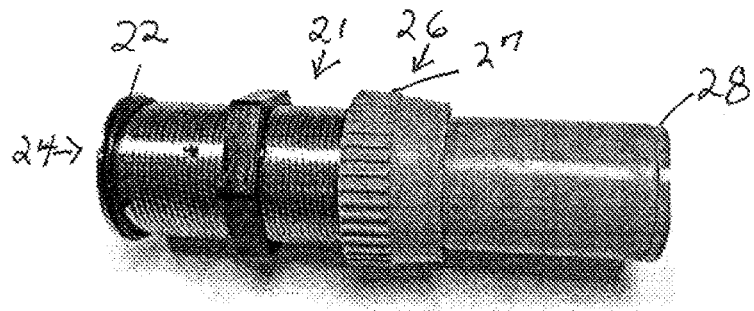
FIG. 2C is a side perspective view of the pushbutton switch inserted into the plug.

FIG. 2A is a side perspective view of the pushbutton switch 21 of the present invention. The switch 21 has a housing 9, a front end 22, a rear end 23, and a pushbutton 24 on the front end 22 to turn the switch 21 on and off. The rear end 23 has male electrical connecting pins 25. FIG. 2B is a front perspective view of a plug 26 for the switch 21. The plug 26 has a front end 27 and a rear end 28. The front end 27 has female electrical connectors 29 for insertion of the electrical connecting pins 25. The switch 21 has, preferably, Deutsch style male connector DTP and DT pins. FIG. 2C is a side perspective view of the pushbutton switch 21 inserted into the plug 26. If a pushbutton switch 21 becomes defective, replacement of the switch 21 does not require disengaging wires to replace the pushbutton switch 21. The pushbutton switch 21 is simply pulled from the plug 26 and a new one inserted into the plug 26.

Figure 3:
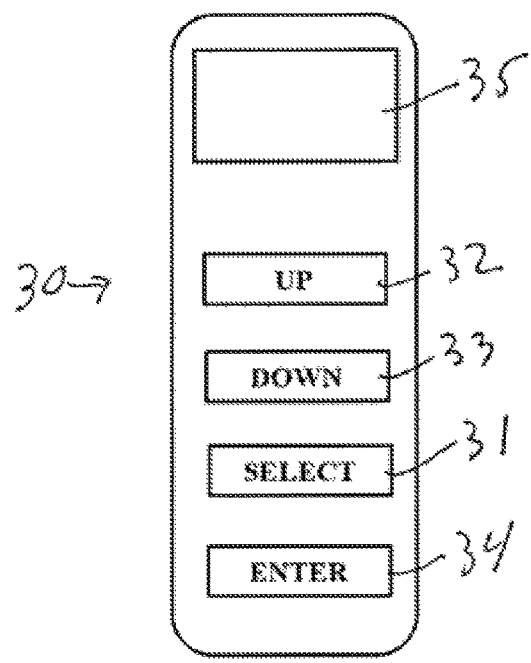
FIG. 3 is a front view of a remote controller for programming the pushbutton switch.

FIG. 3 is a front view of a remote controller (remote) 30 for programming the switch 21. The remote 30 has several programming buttons: a SELECT button 31, an UP button 32, and a DOWN button 33 and a sending button ENTER 34. The remote 30 also has a display screen 35, preferably an LCD display.

Figure 4:
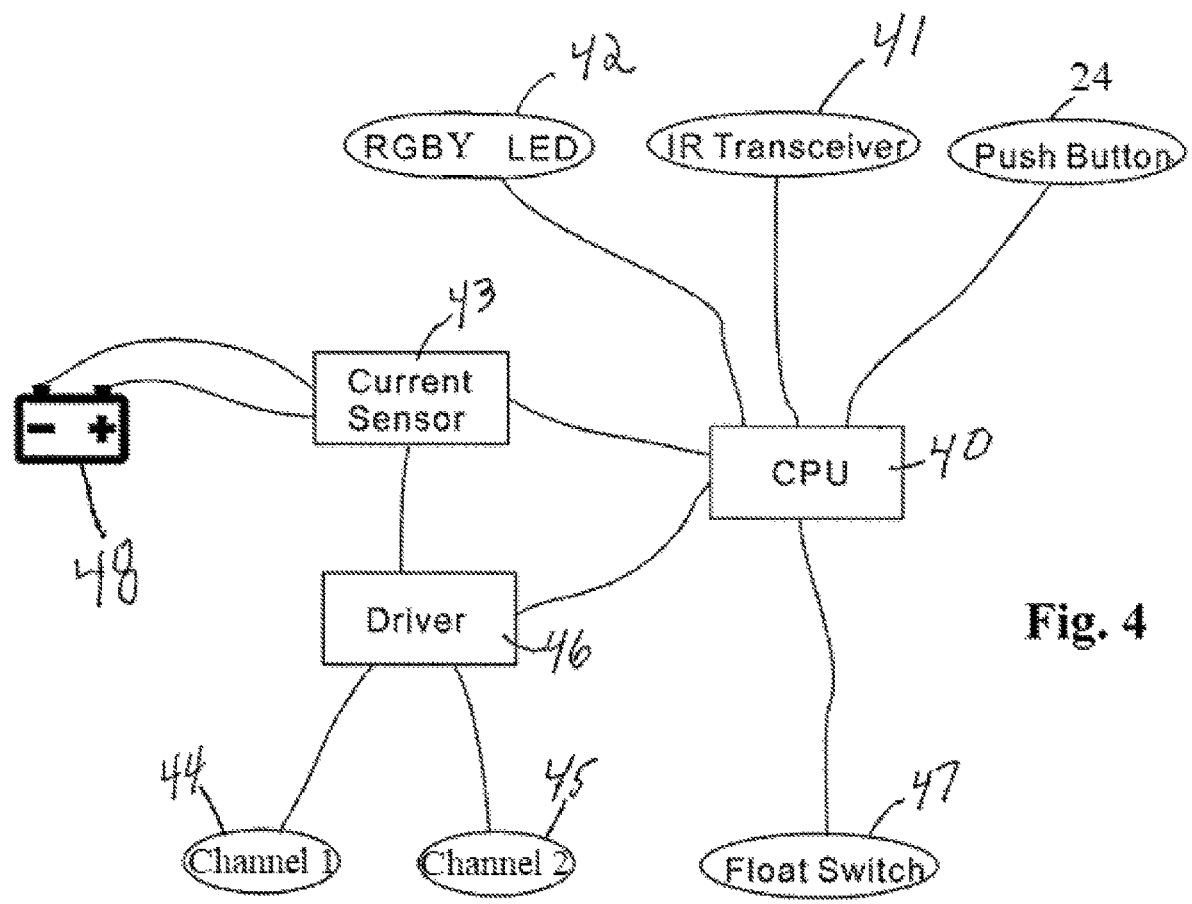
FIG. 4 is a diagram of electrical components of the pushbutton switch.

FIG. 4 is a diagram of electrical components of the pushbutton switch 21. The switch 21 has a central processing unit (CPU) 40 which includes a memory function. A transceiver 41 receives infra-red (IR) signals from the remote 30 to perform various functions programmed in the CPU 40. The pushbutton 24 turns the switch 21 on and off and operates timer and dimmer functions through the CPU 40. The CPU, in response to programming selection from the remote 30, regulates operation of red, green, blue, and yellow LED lights 42, amperage amounts through a current sensor 43, electrical output channels 44 and 45 through OFF-ON-ON switching in driver 46, float switch operation 47 for a sump pump, for example, and breaker function. The plug 26 provides the switch 21 with a power source 48.

Figure 5:
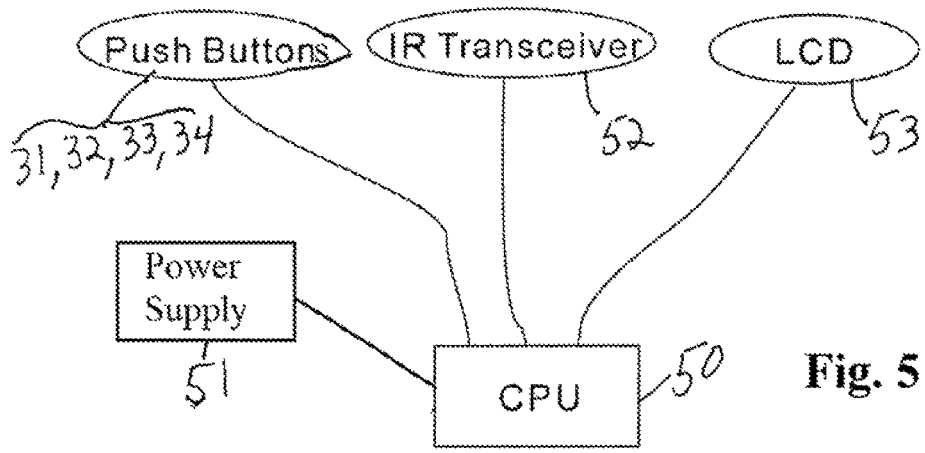
FIG. 5 is a diagram of electrical components of the remote controller.

FIG. 5 is a diagram of the electrical components of the remote 30. The remote has a CPU 50 with memory and a power supply 51, such as a battery. The programming push buttons SELECT 31, UP 32, and DOWN 33, when pressed, provide signals to the CPU 50 in the remote 30 for selection of specific programmed options. The selected specific programmed options are sent to the CPU 40 in the switch 21 when the ENTER button 34 on the remote 30 is pressed. The selected specific programmed options are then executed in the switch 21. The remote 30 has a LCD display 35 which shows programming options for selection. The SELECT button 31 and UP and DOWN buttons 32 and 33, when pressed show the various programming options on the LCD Display 35. The Enter button 34, when pressed, signals the CPU 50 to direct the transceiver 52 to transmit the selected programming options to the transceiver 41 and to the CPU 40 in the switch 21.

Figure 6:
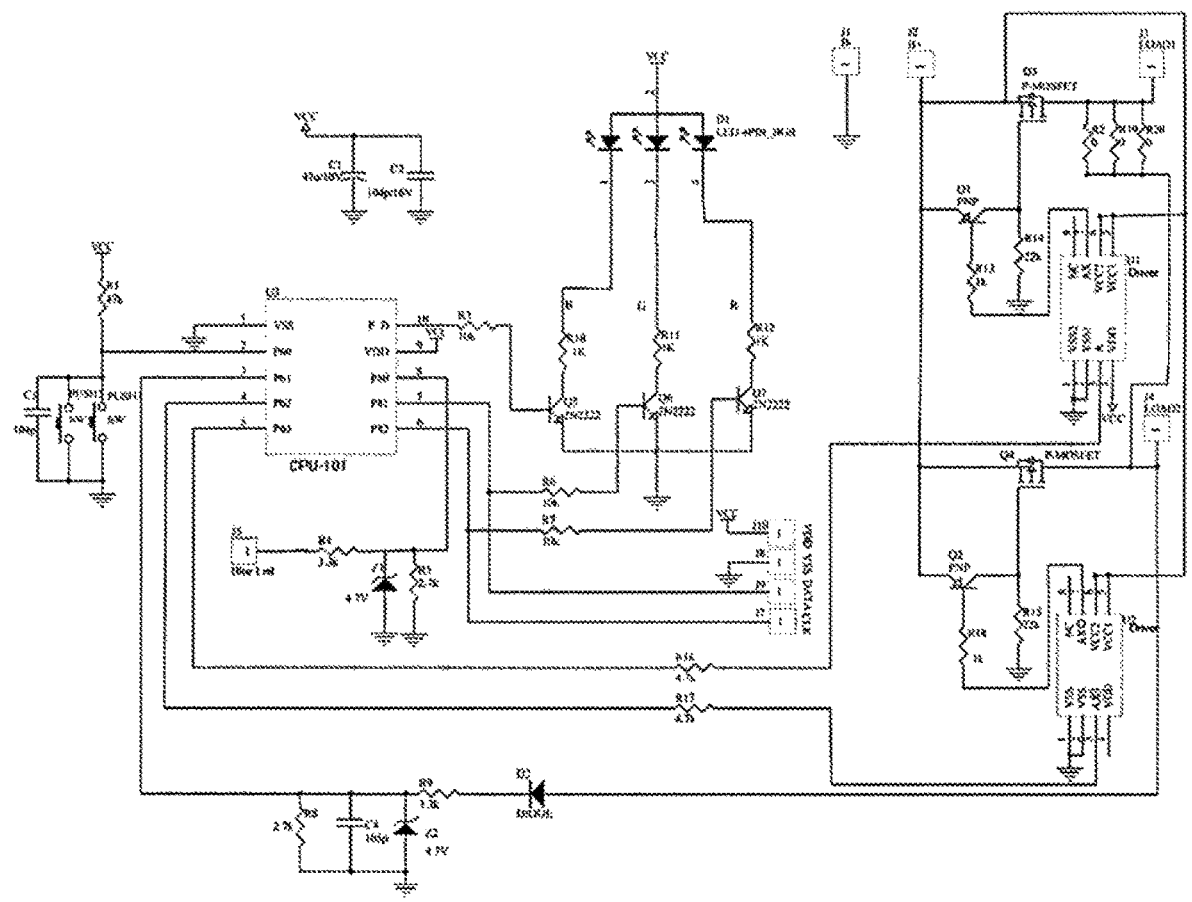
FIG. 6 is a diagram of electrical circuitry of a breaker switch in the pushbutton switch.

FIG. 6 is a diagram of the electrical circuitry of a breaker switch in the pushbutton switch 21. When amperage exceeds a programmed amount, the breaker switch shuts off the pushbutton switch 21.

FIG. 7 is a table showing the select options on the remote 30. These options include Functions, Current, Dimmer, Turn timer on, and Turn timer off. By pressing the Select button 31 repeatedly these options appear consecutively on the LCD display 35 of the remote 30. FIG. 8 is a table showing the select options for the Functions option. When the Functions option is shown in the display 35 the various Function options can be shown on the display 35 by pressing the UP 32 or DOWN 33 buttons. The Function options include various channel operations. F1: ON/OFF provides an on/off function through one channel. F2: provides a momentary on function through one channel. F3: provides Nav/Anc through two channels. This function relates to the use of lights on a boat. "Nav" is a running position and turns front and rear lights on. "Anc" is an anchor position and keeps only a rear light on to indicate the boat is anchored. The front light is off. F4: is an off-on-on switch with two channels. F5: is a Dimmer function with two channels.

FIG. 9 is a flow chart of a method of placing the pushbutton switch 21 in a programming mode with the remote 30. The pushbutton 24 is pushed and held for a selected number of seconds, for example 4 seconds. The pushbutton 24 is then released and a first color flashes on the front 22 of the switch 21, indicating that the switch 21 is ready to be placed in the programming mode. The Select button 31 is pressed and the Up 32 or Down 33 buttons are pressed to scroll through the options. When the FUNCTION option appears on the display 35 the Select button 31 is pressed and held. Color 2 flashes fast on the front 22 of switch 21, indicating that the switch 21 is in the programming mode. The pushbutton switch 21 is now configured to be programmed remotely with the remote controller 30. To exit the programming mode the switch button 24 is pushed and held.

FIG. 10 is a flow chart of the method of programming a functions option in the pushbutton switch 21 with the remote 30. The Select button 31 is pressed repeatedly until the FUNCTION option appears on the display 35. The UP 31 or the DOWN 32 buttons are used to select one of the functions listed in FIG. 8. The Enter button 34 on the remote 30 is pressed and held to enter the selected function into the switch 21. Color 2 flashes fast on the front 22 of switch 21 if the selected function was entered.

FIG. 11 is a flow chart of a method of programming an electrical current option in the pushbutton switch 21 with the remote 30. The SELECT button 31 is pressed repeatedly until the CURRENT option appears on the display 35. The UP 31 or the DOWN 32 buttons are used to adjust the amperage. The ENTER button 34 on the remote 30 is pressed and held to enter the selected amperage into the switch 21. Color 2 flashes fast on the front 22 of switch 21 if the selected function was entered.

FIG. 12 is a flow chart of a method of reading a value on a display 35 for verification of an entered electrical current for the pushbutton switch 21. The SELECT button 31 is pressed repeatedly until the CURRENT option appears on the display 35. The SELECT button 31 is pressed and held. The value of the entered current is shown on the display 35.

FIG. 13 is a flow chart of a method of programming the Dimmer option in the pushbutton switch 21 with the remote 30. The SELECT button 31 is pressed repeatedly until the FUNCTION option appears on the display 35. The UP 31 or the DOWN 32 buttons are used to select DIMMER. The Enter button 34 on the remote 30 is pressed and held to enter the Dimmer function into the switch 21. The SELECT button 31 is pressed repeatedly until DIMMER appears on the display 35. The UP 31 or the DOWN 32 buttons are used to select a percentage of dimming, 0% to 100%. The ENTER button 34 on the remote 30 is pressed and held to enter the dimming percentage into the switch 21. Color 2 flashes fast on the front 22 of the switch 21 if the selected function was entered.

FIG. 14 is a flow chart of a method of programming a timer option in the pushbutton switch 21 with the remote 30. The SELECT button 31 is pressed repeatedly until the TIMER ON or the TIMER OFF option appears on the display 35. The UP 31 or the DOWN 32 buttons are used to select the TIMER ON or TIMER OFF time value. The Enter button 34 on the remote 30 is pressed and held to enter the timer on or timer off time value into the switch 21. For the timer on function, the amount of time selected will be the amount of time that passes before the switch 21 is turned on. For the timer off function, the amount of time selected will be the amount of time that passes before the switch 21 is turned off. The Timer on and the Timer off options can be entered together into the switch 21 so that the switch cycles through on and off at the time intervals entered.

FIG. 15 is a flow chart of the method of operating the pushbutton switch 21 for a timer on or timer off option. The pushbutton 24 on the switch 21 is pressed an held a fixed number of seconds, for example 8 seconds, until light 1 flashes twice. The pushbutton 24 is then released. Light 1 flashes with light 3 to indicate TIMER ON is being entered. Light 2 flashes with light 3 indicating that the timer is on and the switch 21 will turn on after the programmed time has elapsed. The pushbutton 24 is pushed again to terminate the timer on mode and to turn off the flashing light.

FIG. 16 is a flow chart of a method of operating the pushbutton switch 21 to set a Dimmer value. The pushbutton 24 in the switch 21 is pushed in to turn on a light. The pushbutton is pushed and held to make the Dimmer cycle through zero light intensity to 100% light intensity. The pushbutton 24 is released at the desired intensity.

The foregoing description has been limited to specific embodiments of this invention. It will be apparent, however, that variations and modifications may be made by those skilled in the art to the disclosed embodiments of the invention, with the attainment of some or all of its advantages and without departing from the spirit and scope of the present invention. For example, any size or shape pushbutton switch may be used. Any type of electronic device can be operated with the programmable pushbutton switch. Any suitable type of CPU or transceiver may be used.

It will be understood that various changes in the details, materials, and arrangements of the parts which have been described and illustrated above in order to explain the nature of this invention may be made by those skilled in the art without departing from the principle and scope of the invention as recited in the following claims.

The invention claimed is:

1. A user programmable pushbutton switch system, comprising:
   a) a pushbutton switch having a central processing unit (CPU) with memory, an IR transceiver, lights, and a current sensor with a driver having one or more electrical output channels;
   b) a remote controller having a CPU with memory, an IR transceiver, programming buttons UP, DOWN, and SELECT, a sending button ENTER, and a display; and
   c) the programming buttons UP, DOWN, and SELECT, when pressed, provide signals to the CPU in the remote controller for selection of specific program options which are sent to the CPU in the pushbutton switch, when the ENTER button is pressed, and the specific program options are then executed in the pushbutton switch,
   wherein
   the program options include Function, Current, Dimmer, Turn timer off, and Turn timer on options and the Function options include ON/OFF through one electrical output channel, a momentary ON function through one channel, Nav/Anc through two channels, OFF-ON-ON with two channels, and a Dimmer function with two channels.

2. The user programmable pushbutton switch system of claim 1, wherein the pushbutton switch is configured for programming mode by pushing and holding the push button of the pushbutton switch, selecting FUNCTION on the remote controller, and pushing and holding the pushbutton.

3. The user programmable pushbutton switch system of claim 2, wherein the pushbutton switch is programmed for a particular function or for a particular electrical current by selecting FUNCTION or CURRENT, respectively, on the remote controller using the SELECT button, using the UP or DOWN buttons to select a function or adjust the current, and pressing the ENTER button on the remote controller.

4. The user programmable pushbutton switch of claim 2, wherein the Dimmer option is programmed by selecting DIMMER on the remote controller using the SELECT button, adjusting the percentage of dimming using the UP and DOWN buttons on the remote controller, and pressing and holding the ENTER button on the remote controller.

5. The user programmable pushbutton switch of claim 2, wherein the turn timer on or turn timer off option is programmed by selecting TIMER ON or TIMER OFF on the remote controller using the SELECT button, selecting the timer on or off value using the UP and DOWN buttons on the remote controller, and pressing and holding the enter button on the remote controller.

6. The user programmable pushbutton switch of claim 2, wherein the timer is turned on by pushing and holding the pushbutton on the pushbutton switch for a specific number of seconds and then releasing the pushbutton.

7. The user programmable pushbutton switch of claim 2, wherein the Dimmer is set by pushing the pushbutton on the pushbutton switch until a light in the pushbutton switch turns on and then releasing the pushbutton when the light reaches a desired intensity.

8. The user programmable pushbutton switch of claim 2, wherein the display on the remote controller displays a selected current by selecting CURRENT on the remote controller using the SELECT button and the SELECT button is pressed and held.

9. A user programmable pushbutton switch system, comprising:
   a) a pushbutton switch having a central processing unit (CPU) with memory, an IR transceiver, lights, and a current sensor with a driver having one or more electrical output channels;
   b) a remote controller having a CPU with memory, an IR transceiver, programming buttons UP, DOWN, and SELECT, a sending button ENTER, and a display;
   c) the programming buttons UP, DOWN, and SELECT, when pressed, provide signals to the CPU in the remote controller for selection of specific program options which are sent to the CPU in the pushbutton switch, when the ENTER button is pressed, and the specific program options are then executed in the pushbutton switch,
   wherein
      the program options include Function, Current, Dimmer, Turn timer off, and Turn timer on options and the Function options include ON/OFF through one electrical output channel, a momentary ON function through one channel, Nav/Anc through two channels, OFF-ON-ON with two channels, and a Dimmer function with two channels;
   d) the pushbutton switch is configured for programming mode by pushing and holding the push button of the pushbutton switch, selecting FUNCTION on the remote controller, and pushing and holding the pushbutton; and
   e) the pushbutton switch is programmed for a particular function or for a particular electrical current by selecting FUNCTION or CURRENT, respectively, on the remote controller using the SELECT button, using the UP or DOWN buttons to select a function or adjust the current, and pressing the ENTER button on the remote controller.

10. The user programmable pushbutton switch of claim 9, wherein the Dimmer option is programmed by selecting DIMMER on the remote controller using the SELECT button, adjusting the percentage of dimming using the UP and DOWN buttons on the remote controller, and pressing and holding the ENTER button on the remote controller.

11. The user programmable pushbutton switch of claim 9, wherein the turn timer on or turn timer off option is programmed by selecting TIMER ON or TIMER OFF on the remote controller using the SELECT button, selecting the timer on or off value using the UP and DOWN buttons on the remote controller, and pressing and holding the enter button on the remote controller.

12. The user programmable pushbutton switch of claim 9, wherein the timer is turned on by pushing and holding the pushbutton on the pushbutton switch for a specific number of seconds and then releasing the pushbutton.

13. The user programmable pushbutton switch of claim 9, wherein the Dimmer is set by pushing the pushbutton on the pushbutton switch until a light in the pushbutton switch turns on and then releasing the pushbutton when the light reaches a desired intensity.

14. The user programmable pushbutton switch of claim 9, wherein the display on the remote controller displays a selected current by selecting CURRENT on the remote controller using the SELECT button and the SELECT button is pressed and held.

15. A user programmable pushbutton switch system, comprising:
   a) a pushbutton switch having a central processing unit (CPU) with memory, an IR transceiver, lights, and a current sensor with a driver having one or more electrical output channels;
   b) a remote controller having a CPU with memory, an IR transceiver, programming buttons UP, DOWN, and SELECT, a sending button ENTER, and a display;
   c) the programming buttons UP, DOWN, and SELECT, when pressed, provide signals to the CPU in the remote controller for selection of specific program options which are sent to the CPU in the pushbutton switch, when the ENTER button is pressed, and the specific program options are then executed in the pushbutton switch,
   wherein
      the program options include Function, Current, Dimmer, Turn timer off, and Turn timer on options and the Function options include ON/OFF through one electrical output channel, a momentary ON function through one channel, Nav/Anc through two channels, OFF-ON-ON with two channels, and a Dimmer function with two channels;
   d) the pushbutton switch is configured for programming mode by pushing and holding the push button of the pushbutton switch, selecting FUNCTION on the remote controller, and pushing and holding the pushbutton;
   e) the pushbutton switch is programmed for a particular function or for a particular electrical current by selecting FUNCTION or CURRENT, respectively, on the remote controller using the SELECT button, using the UP or DOWN buttons to select a function or adjust the current, and pressing the ENTER button on the remote controller;
   f) the dimmer option is programmed by selecting Dimmer on the remote controller using the SELECT button, adjusting the percentage of dimming using the UP and DOWN buttons on the remote controller, and pressing and holding the ENTER button on the remote controller; and
   g) the turn timer on or turn timer off option is programmed by selecting TIMER ON or TIMER OFF on the remote controller using the SELECT button, selecting the timer on or off value using the UP and DOWN buttons on the remote controller, and pressing and holding the enter button on the remote controller.

16. The user programmable pushbutton switch of claim 15, wherein the timer is turned on by pushing and holding the pushbutton on the pushbutton switch for a specific number of seconds and then releasing the pushbutton.

17. The user programmable pushbutton switch of claim 15, wherein the dimmer is set by pushing the pushbutton on the pushbutton switch until a light in the pushbutton switch turns on and then releasing the pushbutton when the light reaches a desired intensity.

18. The user programmable pushbutton switch of claim 15, wherein the display on the remote controller displays a selected current by selecting current on the remote controller using the SELECT button and the SELECT button is pressed and held.

19. A user programmable pushbutton switch system, comprising:
   a) a pushbutton switch having a central processing unit (CPU) with memory, an IR transceiver, lights, and a current sensor with a driver having one or more electrical output channels;
   b) a remote controller having a CPU with memory, an IR transceiver, programming buttons UP, DOWN, and SELECT, a sending button ENTER, and a display;
   c) the programming buttons UP, DOWN, and SELECT, when pressed, provide signals to the CPU in the remote controller for selection of specific program options which are sent to the CPU in the pushbutton switch, when the ENTER button is pressed, and the specific program options are then executed in the pushbutton switch,
   wherein
      the program options include Function, Current, Dimmer, Turn timer off, and Turn timer on options and the Function options include ON/OFF through one electrical output channel, a momentary ON function through one channel, Nav/Anc through two channels, OFF-ON-ON with two channels, and a Dimmer function with two channels;
   d) the pushbutton switch is configured for programming mode by pushing and holding the push button of the pushbutton switch, selecting functions on the remote controller, and pushing and holding the pushbutton;
   e) the pushbutton switch is programmed for a particular function or for a particular electrical current by selecting FUNCTION or CURRENT, respectively, on the remote controller using the SELECT button, using the UP or DOWN buttons to select a function or adjust the current, and pressing the ENTER button on the remote controller;
   f) the Dimmer option is programmed by selecting DIMMER on the remote controller using the SELECT button, adjusting the percentage of dimming using the UP and DOWN buttons on the remote controller, and pressing and holding the ENTER button on the remote controller;
   g) the turn timer on or turn timer off option is programmed by selecting TIMER ON or TIMER OFF on the remote controller using the SELECT button, selecting the timer on or off value using the UP and DOWN buttons on the remote controller, and pressing and holding the ENTER button on the remote controller;
   h) the timer is turned on by pushing and holding the pushbutton on the pushbutton switch for a specific number of seconds and then releasing the pushbutton;
   i) the Dimmer is set by pushing the pushbutton on the pushbutton switch until a light in the pushbutton switch turns on and then releasing the pushbutton when the light reaches a desired intensity; and
   j) the display on the remote controller displays a selected current by selecting CURRENT on the remote controller using the SELECT button and the SELECT button is pressed and held.

* * * * *